D. C. BURSON.
Machine for Converting Motion.
No. 166,338.  Patented Aug. 3, 1875.
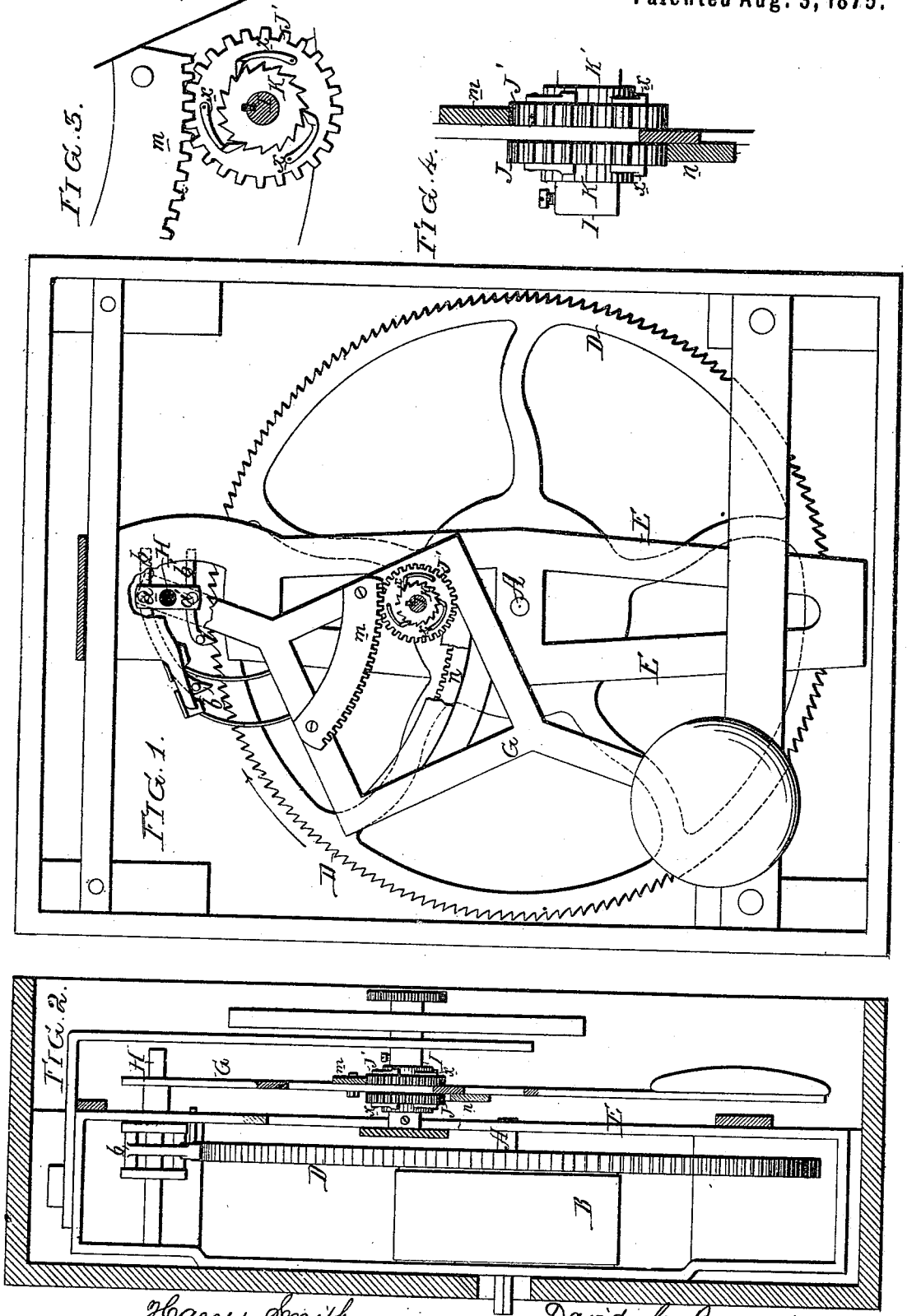
Witnesses: Harry Smith, Thomas McIlvain
David C. Burson
By his Attorneys, Howson and Son

UNITED STATES PATENT OFFICE.

DAVID C. BURSON, OF PHILADELPHIA, PENNSYLVANIA.

IMPROVEMENT IN MACHINES FOR CONVERTING MOTION.

Specification forming part of Letters Patent No. 166,338, dated August 3, 1875; application filed July 8, 1875.

*To all whom it may concern:*

Be it known that I, DAVID C. BURSON, of Philadelphia, Pennsylvania, have invented a new Mechanical Movement, of which the following is a specification:

The object of my invention is to convert the vibrating motion of a pendulum into a continuous rotary motion, and this object I attain in the manner which I will now proceed to describe, reference being had to the accompanying drawing, in which—

Figure 1 is a front view of the devices by which the mechanical movement is produced; Fig. 2, a vertical section of Fig. 1; and Figs. 3 and 4, detached views of parts of the device.

To suitable bearings in a frame, E, is adapted a spindle, A, to which is secured an escapement-wheel, D, a coiled spring, B, being so connected to the frame and spindle as to tend to turn the latter and the escapement-wheel in the direction of the arrow, or a weight may be substituted for the spring for this purpose.

To a spindle, H, which has its bearings in the frame E, is secured the upper end of the rigid arm G of a pendulum, and to the same spindle are secured the two short arms $a$ and $a$, the former carrying the pawl $b$ and the latter the pawl $b'$, both pawls being adapted to the teeth of the escapement, and serving with the pendulum as a means of controlling the movement of the said wheel. I prefer this form of escapement-motion because it allows the power of the escapement-wheel to be exerted with more directness and less loss than the usual form of escapement.

I is the shaft, to which a continuous rotary motion has to be imparted from the pendulum, and on which two cog-wheels, J and J', are carried, but are loose on the shaft. To the wheel J are hinged a number of spring-pawls, $x$, three in the present instance, the pawls being adapted to a ratchet-wheel, K, secured to the said shaft L. The cog-wheel J' carries similar pawls adapted to the teeth of a ratchet-wheel, K', on the shaft I. An upper toothed segment, $m$, secured to the pendulum-arm, gears into the wheel J', and the lower toothed segment $n$ into the wheel J. As the pendulum vibrates each toothed segment will, in turn, act as a driver to turn the shaft I through the medium of one of the cog-wheels, its pawls and adjacent ratchet-wheel, and while one segment is thus operating, the other simply turns its wheel backward on the shaft, the pawls of the wheel passing freely over the teeth of the ratchet-wheel, hence the result of the pendulum's vibration will be the continuous rotation of the shaft I.

I claim as my invention—

The combination of the main wheel D, driven by a spring or weight, the escapement, and the pendulum, having two toothed segments, $m$ and $n$, with the shaft I, cog-wheels J J', each having pawls, and the ratchet-wheels K K', all substantially as set forth, for the purpose specified.

In testimony whereof I have hereunto signed my name to this specification in the presence of two subscribing witnesses.

DAVID C. BURSON.

Witnesses:
EDWARD H. ECKFELDT,
HARRY SMITH.